United States Patent [19]

Mizuno et al.

[11] Patent Number: 5,170,865

[45] Date of Patent: Dec. 15, 1992

[54] APPARATUS FOR CONTROLLING AN ELEVATOR DOOR USING A DRIVE MOTOR SLIP FREQUENCY SIGNAL

[75] Inventors: Masamoto Mizuno; Terumi Hirabayashi; Masanori Tawada; Toshiyuki Kodera, all of Inazawa, Japan

[73] Assignee: Mitsubishi Denki Kabushiki Kaisha, Tokyo, Japan

[21] Appl. No.: 615,288

[22] Filed: Nov. 19, 1990

[30] Foreign Application Priority Data

Dec. 15, 1989 [JP] Japan .................. 1-324946

[51] Int. Cl.⁵ .............................................. B66B 13/14
[52] U.S. Cl. ............................................. 187/103
[58] Field of Search ............. 187/103, 119; 318/721, 318/801

[56] References Cited

U.S. PATENT DOCUMENTS

| | | |
|---|---|---|
| 3,814,214 | 6/1974 | Booker, Jr. ................ 187/103 |
| 4,051,419 | 9/1977 | Takahashi ................. 318/721 |
| 4,227,137 | 10/1980 | Hartman .................. 318/801 |
| 4,300,663 | 11/1981 | Hmelovsky et al. ........ 182/103 |
| 4,815,567 | 3/1989 | Ikejima ................... 182/119 |
| 4,982,816 | 1/1991 | Doi et al. ................ 187/119 |

Primary Examiner—A. D. Pellinen
Assistant Examiner—Lawrence E. Colbert
Attorney, Agent, or Firm—Leydig, Voit & Mayer

[57] ABSTRACT

An apparatus for controlling an elevator door comprises a motor which closes and opens the door of an elevator and applies to the door torque necessary for maintaining a closed state of the door, an inverter apparatus for controlling the driving of the motor, a polarity deciding device for deciding the polarity of a slip frequency signal output from the inverter apparatus, and a driving stop device for causing the inverter apparatus to stop the driving of the motor when the polarity deciding device detects the inversion of the polarity of the slip frequency signal during the time that a closed state of the door is maintained by the motor.

8 Claims, 8 Drawing Sheets

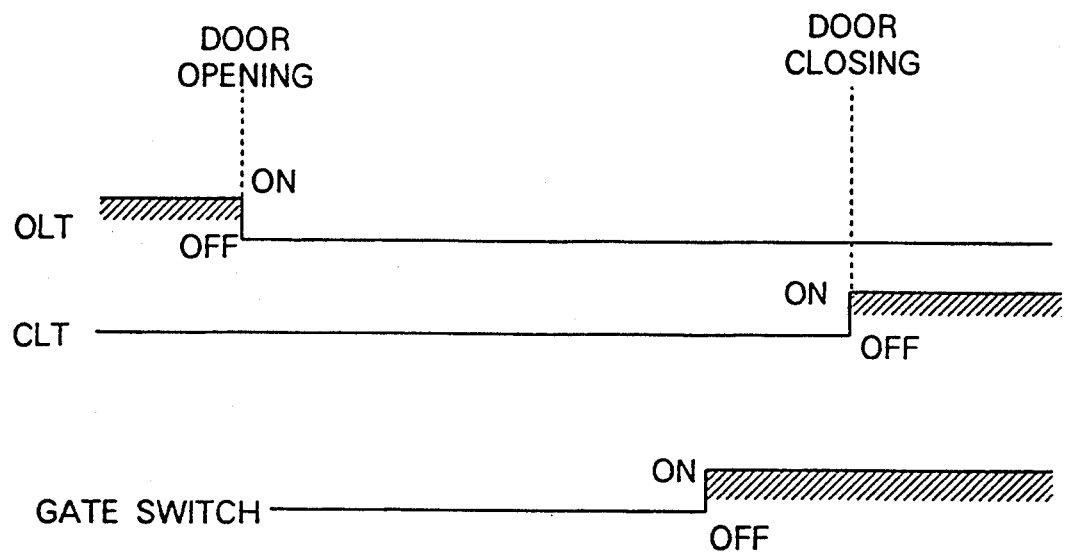
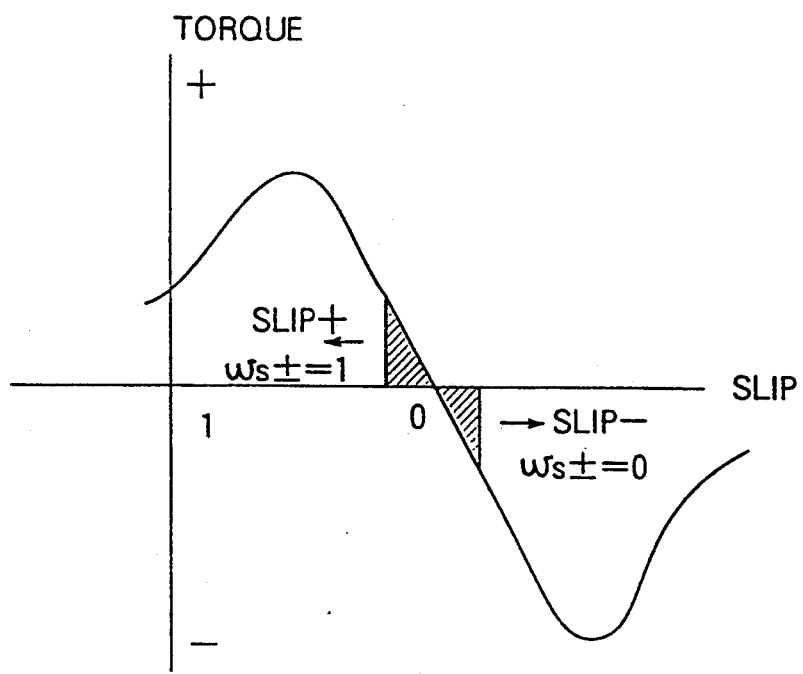

APPARATUS FOR CONTROLLING AN ELEVATOR DOOR USING A DRIVE MOTOR SLIP FREQUENCY SIGNAL

BACKGROUND OF THE INVENTION

1. Field of the Invention

The present invention relates to an apparatus for controlling the driving of an electric motor for opening and closing the door of an elevator.

2. Description of the Related Art

FIG. 3 shows the mechanical structure of a door apparatus for elevators.

In FIG. 3, reference numeral 1 denotes an elevator door, reference numeral 2 denotes an entrance of a cage, reference numeral 3 denotes a door hanger fixed at the upper end of the door 1, reference numeral 4 denotes a hanger case for holding the door hanger 3, and reference numeral 5 denotes a rail provided on the hanger case 4. Reference numerals 6 and 7 denote hanger rollers and upward thrust rollers, respectively, which are moved on the rail 5 so as to guide the door 1 to be opened and closed. Reference numeral 8 denotes an attachment apparatus which is provided on the door 1 and which is engaged with an apparatus (not shown) provided on an unillustrated door of an elevator shaft prescribed within a elevator shaft zone of the elevator shaft so as to cause the door 1 to interlock with the elevator shaft door in the prescribed zone. Reference numeral 9 denotes a drive apparatus which is provided on the hanger case 4 for the purpose of driving the door 1, reference numeral 10 denotes a door driving motor contained in the driving apparatus 9, and reference numeral 11 denotes a four-throw driving link for opening and closing the door driven by the driving apparatus 9. Reference numeral 12 denotes a CLT sensor which indicates a closed state of the door, reference numeral 13 denotes a safety gate switch which also indicates a closed state of the door, and reference numeral 14 denotes an OLT sensor which indicates an open state of the door 1. Reference numeral 14A denotes a dog for actuating the sensors, and reference numeral 14B denotes an inverter apparatus for driving the door motor.

As shown in FIG. 4, when the OLT sensor 14 is turned on in an open state of the door 1, the sensor 14 outputs an OLT signal having a level "1". When the CLT sensor 12 is turned on in a closed state of the door 1, the sensor 12 outputs a CLT signal having a level "1". When the gate switch 13 is turned on during the course of transition from an open state to a closed state of the door, the switch 13 outputs a gate switch signal $S_G$ having a level "1".

FIG. 5 shows an example of a vector control inverter circuit for driving the above-described door system for an elevator. For example, a three-phase alternating current or a single-phase alternating current of 200 V or 220 V, which is input from a power source, is rectified by a diode bridge 15 and smoothed by a smoothing capacitor 16 to generate a dc voltage. The dc voltage is converted to a sine-wave motor current by an inverter 17 comprising switching elements such as transistors, FET's or the like. During this control, the switching elements of the inverter 17 are subjected to pulse width modulation by the PWM pulse generated from a PWM pulse generator 19. In this way, the speed and torque of the door driving motor 10 are controlled.

The speed of the door driving motor 10 is detected by an encoder 10A provided on the motor shaft. The speed $\omega_r^*$ detected by the encoder 10A is added to the speed command $\omega_r$ generated from a speed command generator 22 at a first addition point 23 to determine a speed deviation $\Delta\omega_r$. When the speed deviation $\Delta\omega_r$ is input to a speed amplifier 24, the amplifier 24 calculates the torque necessary for the door driving motor 10 in accordance with the speed command $\omega_r$ and inputs to a slip calculating section 26 a torque command, e.g., a current iq corresponding to the torque and a current command id corresponding to excitation, which is generally a constant value within a constant torque region. The slip calculating section 26 generates a slip frequency $\omega_S$. The slip frequency $\omega_S$ is added to the speed $\omega_r^*$ detected by the encoder 10A at a second addition point 27 and then input to a phase counter 28 serving as an integrator. In the phase counter 28, the rotational angle of the driving motor is calculated by the equation $\theta_r = \int (\omega_r^* \pm \omega_2)\, dt$.

The phase angle $$\theta i = \tan^{-1} \frac{iq}{id}.$$

which is calculated from the current iq corresponding to the torque and the current command id corresponding to excitation by a phase angle calculating section 30, is added to the rotational angle $\theta_r$ of the magnetic field at a third addition point 29 to determine an actual current phase angle $\theta = \theta_r + \theta i$. From the phase angle $\theta$ and the current amplitude I generated from a current amplitude calculating section 25, a current command generating section 21 generates a U-phase current command $I_u = |I| \cdot \sin\theta$ and a V-phase current command $I_v = |I| \cdot \sin(\theta + 2/3\,\pi)$. From the current commands and the actual motor currents $I_u^*$, $I_v^*$, which are respectively detected by dc current transformers 18, deviations $\Delta I_u$, $\Delta I_v$ and $\Delta I_w = -I_u - \Delta I_v$ are determined by a DC amplifier 20. A three-phase PWM voltage command corresponding the three deviation values is generated from a PWM pulse generator 19. The pulse train is supplied to the inverter 17 so as to actuate the switching elements thereof. This permits the current, voltage and frequency of the door driving motor 10 to be controlled to predetermined values. The above-described series of operations controls the rotational speed and the torque of the door driving motor 10.

In the vector control inverter, a section 31 shown by a one-dot chain line in FIG. 5 comprises a microcomputer. FIG. 6 shows an example of the configuration of the microcomputer. In the drawing, reference numeral 45 denotes a CPU for executing the command read by a read only memory ROM 46. Reference numeral 51A denotes a RAM for storing data. Reference numeral 50 denotes an I/O interface for storing ir the CPU the CLT signal, OLT signal, open-door command signal $S_o$, close-door command signal $S_c$, gate switch signal $S_G$ and an active signal $S_u$, all of which are input from external sensors. Reference numeral 48 denotes a timer for generating the slip frequency $\omega_S$. The period of the slip frequency $\omega_S$ is supplied to the timer 48 from the CPU 45. Reference numeral 47 denotes an I/O interface for outputting the polarity of the slip frequency $\omega_S$, i.e., slip sign output $\omega_S \pm$. Reference numeral 49 denotes a reversible counter for counting the speed detection pulse trains generated by the encoder 10A provided on the motor shaft.

FIG. 7 shows an example of a circuit for generating the U-phase current command $I_u$ and the V-phase current command $I_v$ by using the slip frequency $\omega_s$, the current amplitude command $|I|$ and the phase angle command $\theta i$, all of which are output from the microcomputer 31 configured as described above. In the drawing, reference numeral 32 denotes a circuit for discriminating between the directions of the pulses PHA and PHB, which are encoder feedback pulse trains having phases 90° shifted from each other, to output the pulses as a normal pulse CWP and a reverse pulse CCWP.

FIG. 8 illustrates the pulses PHA and PHB input to discriminating circuit 32 and the pulses CWP and CCWP by the discriminating circuit 32.

In FIG. 7, reference numeral 33 denotes a circuit for calculating the rotational angle $\omega_r = \int (\omega_r^* \pm \omega_s)$ dt in combination with a phase counter 34. The slip pulse trains $\omega_s$ are divided into the signs + and −, which are input to the phase counter 34, on the basis of the slip sign output $\omega_s\pm$ from the microcomputer 31. The relation between the rotational direction of the motor 10 and the slip sign output $\omega_s$ 35 is the following:

Normal rotation: input+during power running and input−during regeneration

Reverse rotation: input−during power running and input+during regeneration

The encoder feedback pulse trains CWP, CCWP and the slip pulse train $\omega_s$ are input to the phase counter 34 with a phase shift by using a synchronous circuit (not shown), as shown in FIG. 9, so that the rotational angle $\theta_r = \int (\omega_r^* + \omega_s)$ dt can be calculated. In the drawing, reference numerals 41 and 41A denote AND gates; reference numeral 42 denotes an inverter gate, and reference numerals 43 and 44 denotes OR gates. The values $\sin \theta = \sin (\theta_r + \theta_i)$ and $\sin (\theta + \frac{2}{3} \pi) = \sin (\theta_r + \theta_i + \frac{2}{3} \pi)$ are output from ROM 35, which serves as a sine wave table, on the basis of the output $\theta_r$ from the phase counter 34 and the phase output $\theta_i$ from the microcomputer 31. On the basis of the above digital output and the current amplitude output $|I|$ from the microcomputer 31, the multiplication type D/A converters 37, 38, 39 of a current command generating circuit 40 generate the following analog values of current command output:

$$I_u = |I| \cdot \sin (\theta_r + \theta_i) \times Vref$$

$$I_v = |I| \cdot \sin (\theta_r + \theta_i + \int \pi) \times Vref$$

During the control of the door of an elevator driven by the vector control inverter which operates on the basis of the above-described principle, an abnormality detecting circuit 52A is generally added to the circuit shown in FIG. 7, as shown in FIG. 10, for the purpose of detecting the abrupt opening of the door, which is caused by a malfunction of the microcomputer 31 during the operation of the elevator. The abnormality detecting circuit 52A comprises a flip flop 51, NAND gates 54, 57, and an AND gate 55, and an inverter gate 56. If the gate switch 13 shown in FIG. 3 is turned off and outputs a gate switch signal $S_G$ level of "0" during the movement of the elevator, the output from the NAND gate 57 has a level of "0" because the active signal $S_u$ has a level of "1". A signal having a level of "0" is input to the set terminal of the flip flop 51 through the AND gate 55 so as to set the flip flop 51 to output a gate cutoff signal to the inverter 17. This operation causes the driving of the motor 10 to be stopped.

In the same way as described above, if the elevator lifting control board of the elevator inputs the active signal $S_u$ having a level of "1" to the circuit 52A in a state when the door is closed, and the encoder 10A inputs the reverse pulse CCWP, i.e., the open-door pulse, to the circuit 52A, the circuit 52A detects an abnormality. As a result, the output from the NAND gate 54 takes on a level of "0", and the flip flop 51 is set so that the gate cutoff signal is output to the inverter 17.

In this method, however, even if the motor 10 is driven by an appropriate driving control signal or driving output in the direction causing the door to close, when the motor 10 is rotated in the opposite direction by forcing the door to open, or when the door is slightly pushed back and vibrates at the door stop position when being closed, the encoder 10A engaged with the motor 10 outputs the pulse CCWP with a reverse phase. This output sets the flip flop 51 and cuts off the gate of the inverter 17 so that the motor 10 is stopped. Since there is thus no pushing torque in the direction of closing of the door, the door can be easily opened manually. This method thus has the problem that the passengers of the elevator are brought into a very dangerous condition.

SUMMARY OF THE INVENTION

The object of the present invention is to resolve the above-described problem of the prior art and to provide an apparatus for controlling an elevator door which permits improvement in safety and reliability.

An apparatus for controlling an elevator door in accordance with the present invention comprises a motor which opens and closes the elevator door and applies to the door torque necessary for maintaining a closed state of the door, an inverter apparatus for controlling the driving of the motor, a polarity deciding means for deciding the polarity of the slip frequency signal output from the inverter apparatus, and a stopping means for causing the inverter apparatus to stop the driving of the motor when the polarity deciding means detects the inversion of the polarity of the slip frequency signal during a time the closed state of the door is maintained by the motor.

BRIEF DESCRIPTION OF THE DRAWINGS

FIG. 2 is a graph of operating characteristics of the embodiment of FIG. 1;

FIG. 4 is a time chart which shows the operation of each of the sensors shown in FIG. 3;

DESCRIPTION OF THE PREFERRED EMBODIMENTS

An embodiment of the present invention will be described below with reference to the attached drawings.

Figure 1:
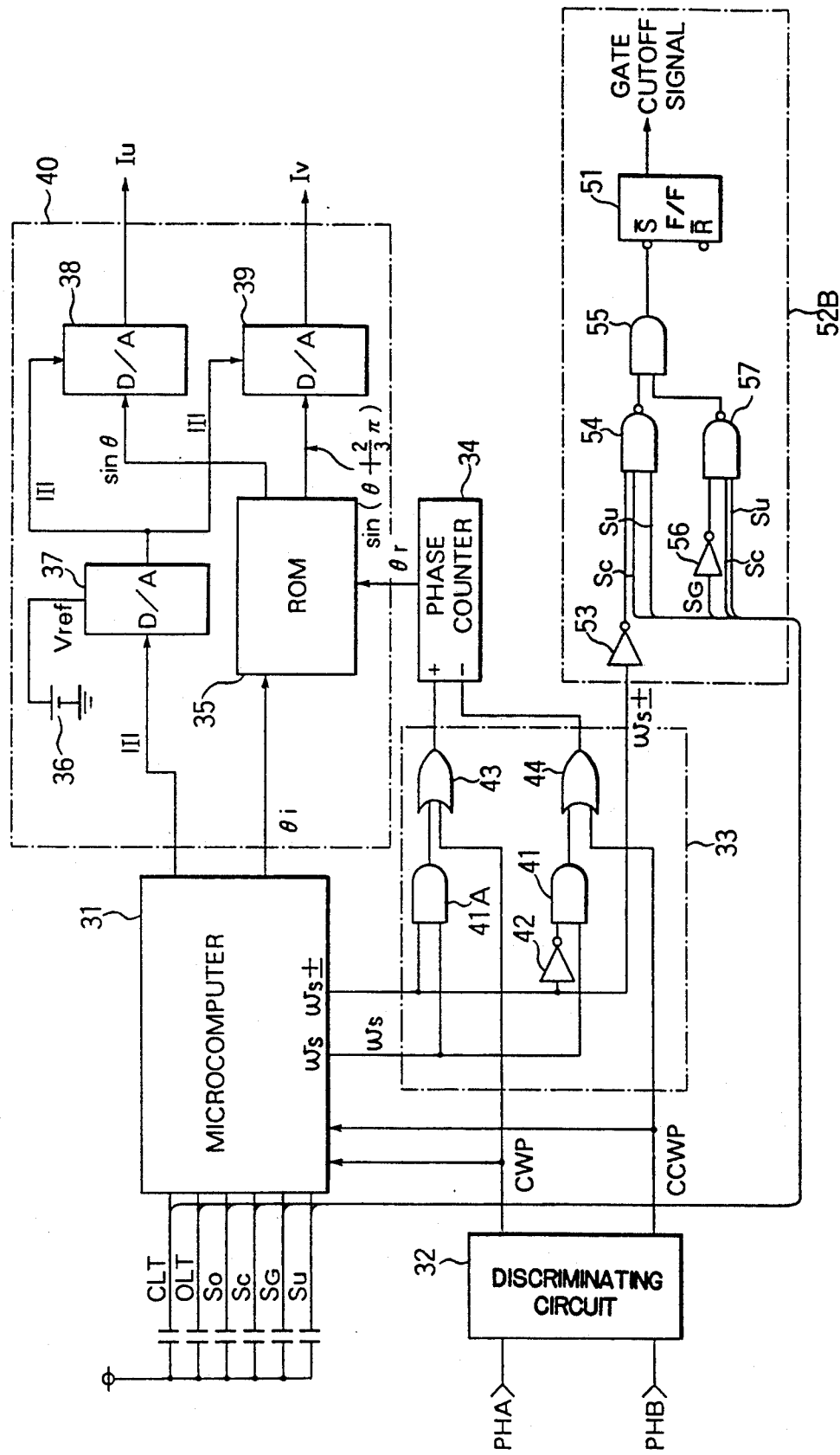
FIG. 1 is a block diagram of a principal portion of an apparatus for controlling an elevator door in accordance with an embodiment of the present invention.
Figure 3:
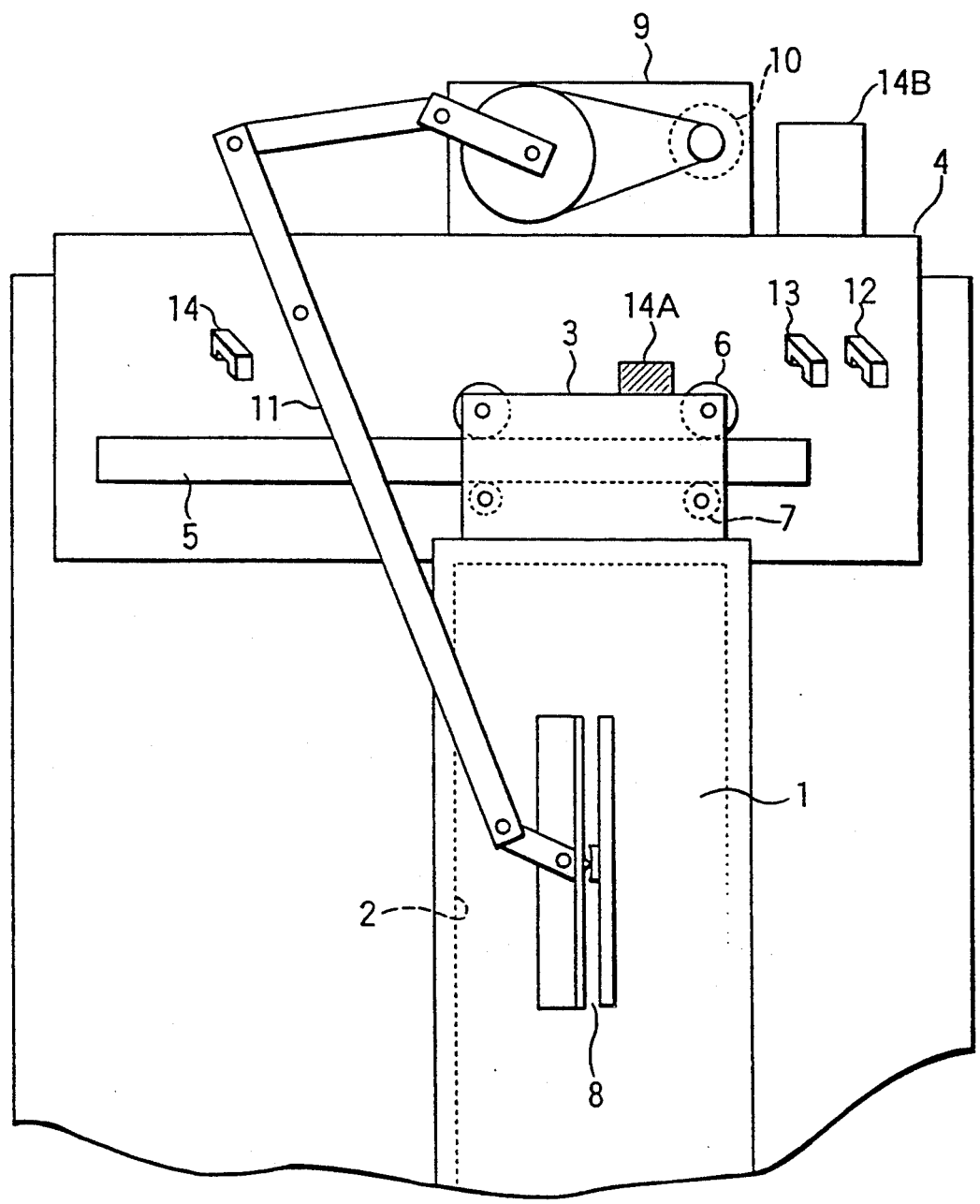
FIG. 3 is a schematic diagram of a door apparatus of an elevator.
Figure 5:
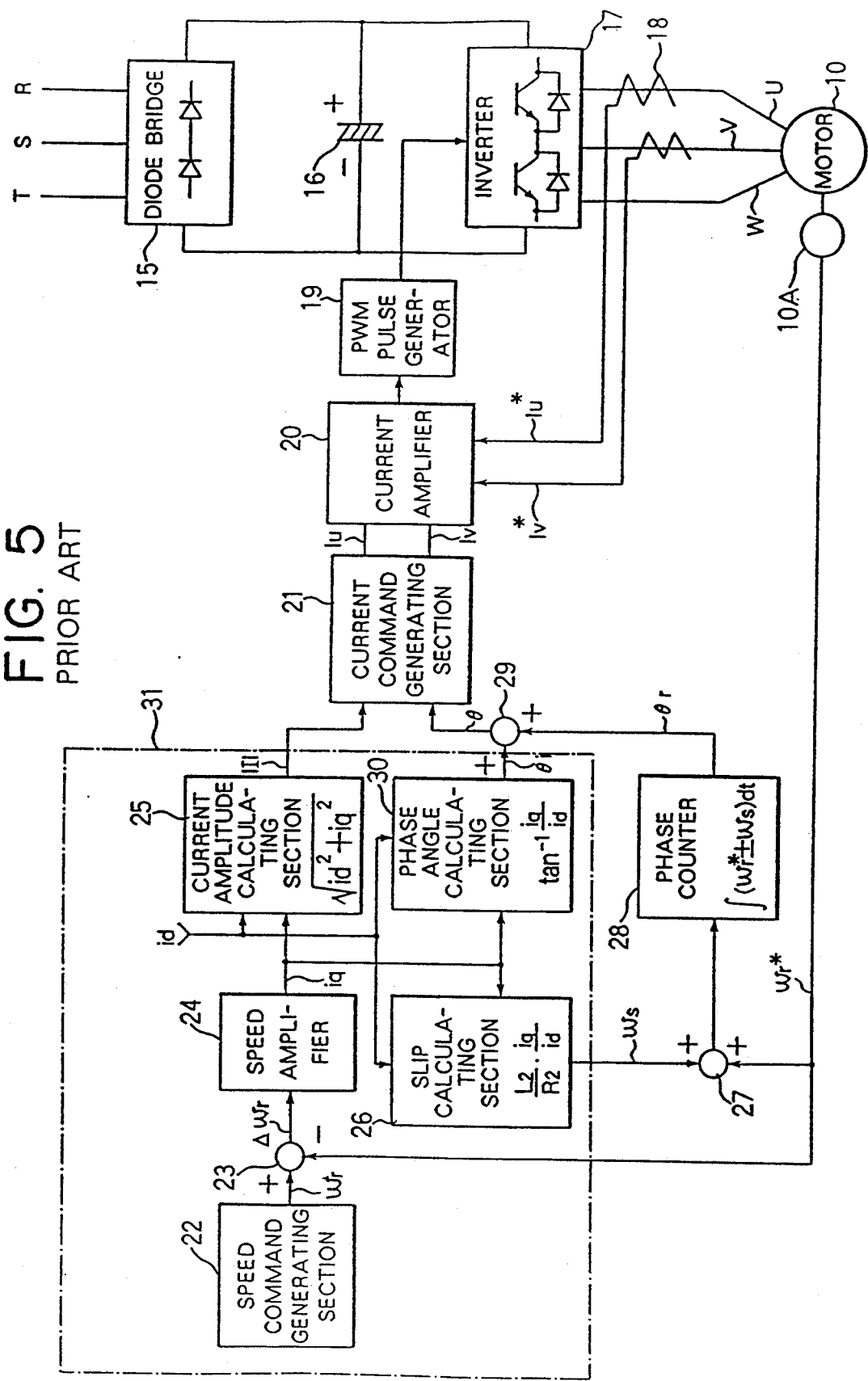
FIG. 5 is a block diagram of a conventional door controlling apparatus.
Figure 6:
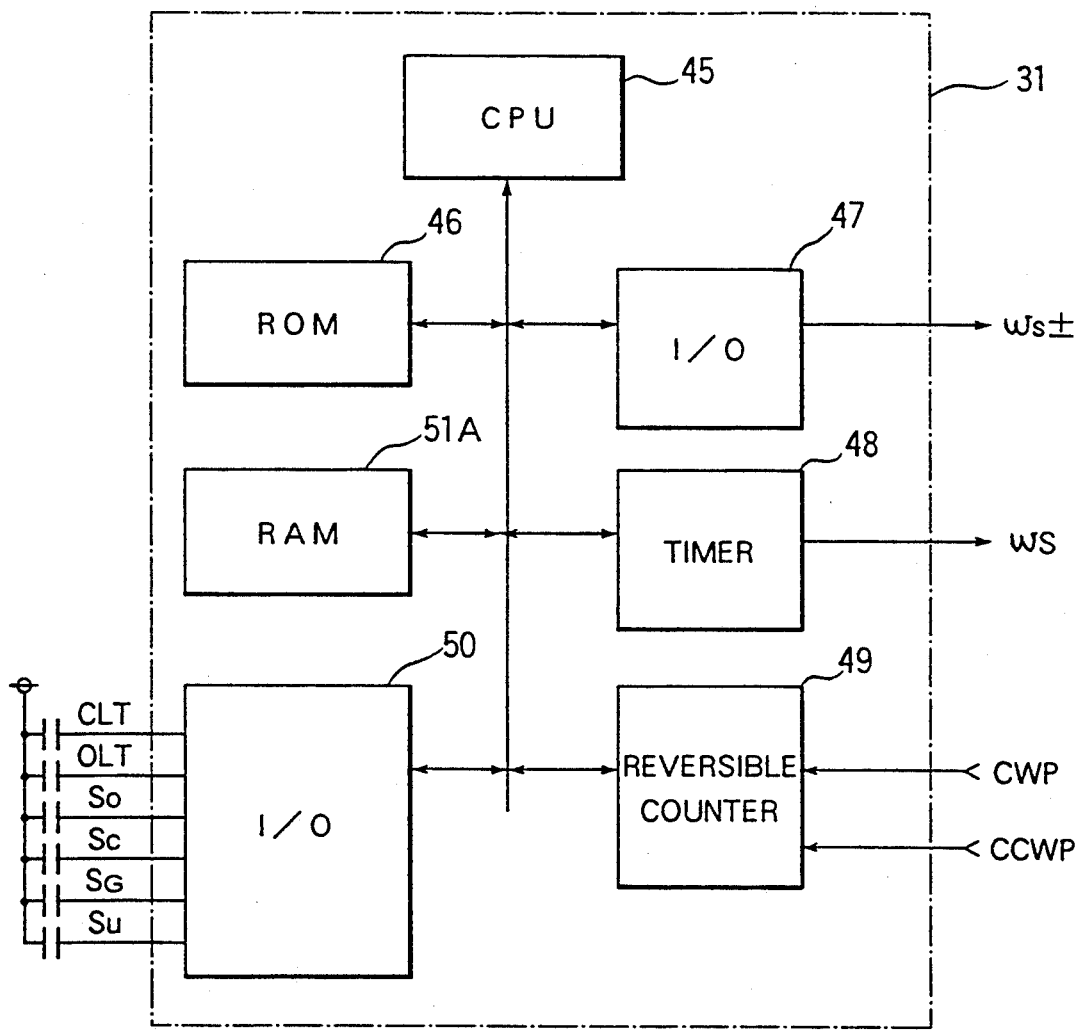
FIG. 6 is a block diagram of the control section of the apparatus shown in FIG. 5 when the control section comprises a microcomputer.
Figure 7:
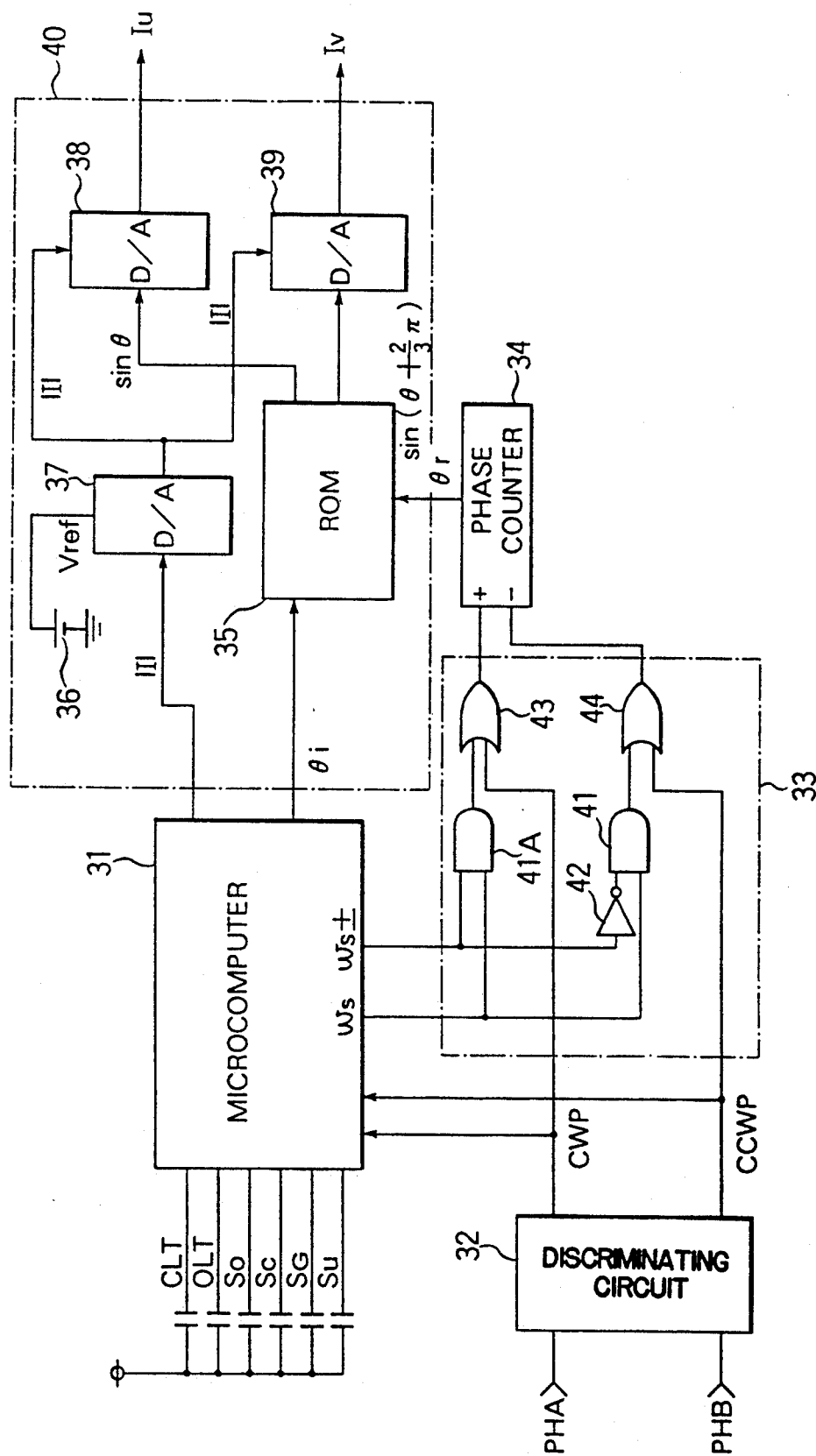
FIG. 7 is a block diagram of a principal portion of a conventional door controlling apparatus.
Figure 8:
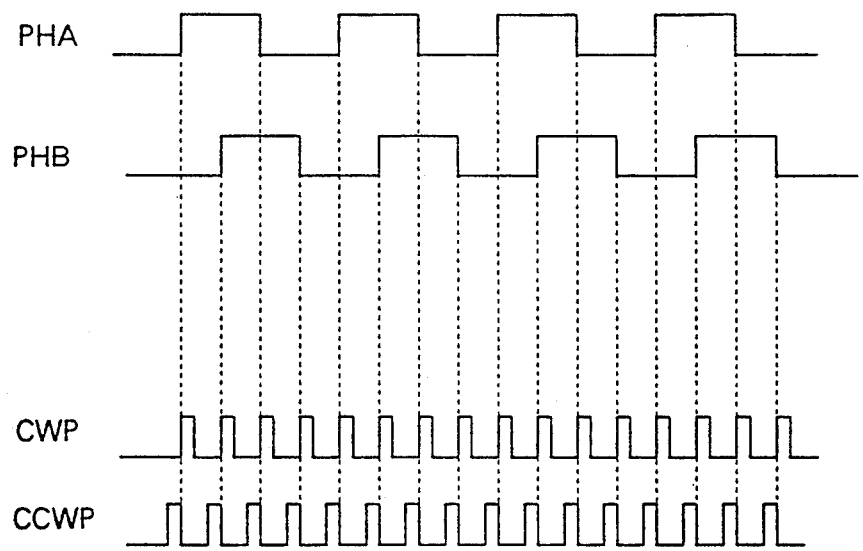
FIGS. 8 and 9 are time charts which show the operation of the apparatus shown in FIG. 7.
Figure 9:
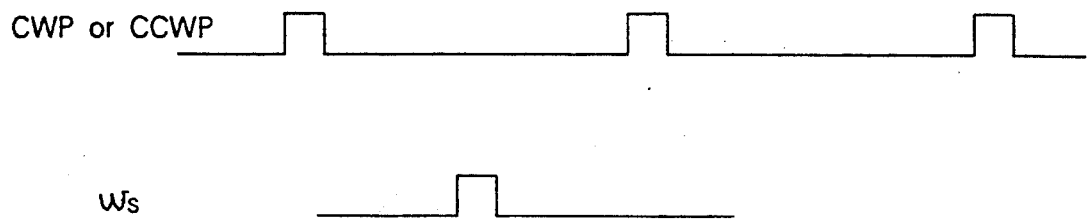
Figure 10:
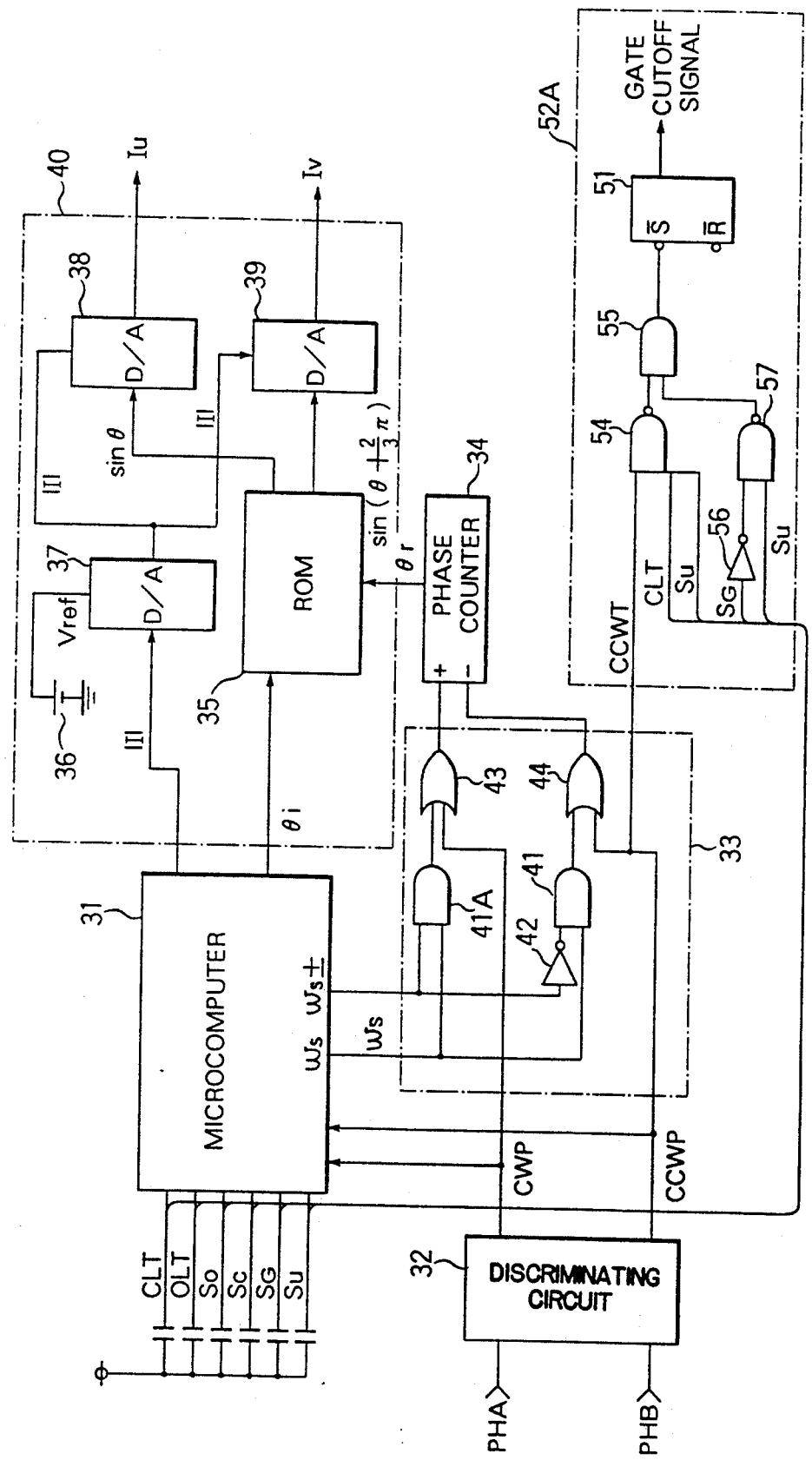
FIG. 10 is a block diagram of a principal portion of another conventional door controlling apparatus.

In the door controlling apparatus shown in FIG. 1, an abnormality detecting circuit 52B is added to the conventional apparatus shown in FIG. 7. Although not shown in FIG. 1, a current amplifier 20, a PWM pulse generator 19, a diode bridge 15, a smoothing capacitor 16, an inverter 17, a dc current transformer 18, a motor 10 and an encoder 10A are connected to a current command generating circuit 40 as shown in FIG. 5. Since the operation of the sections other than the abnormality detecting circuit 52B is the same as that of the above-described apparatus shown in FIG. 7, it is not described below.

The abnormality detecting circuit 52B has an inverter gate 53 which is connected to a microcomputer 31 and a NAND gate connected to the inverter gate 53. A close-door-command signal $S_c$ and an active signal $S_u$ (indicating movement of the elevator) are input to the NAND gate 54. The abnormality detecting circuit 52B has an inverter gate 56 for inputting a gate switch signal $S_G$ and a NAND gate 57 is connected to the inverter gate 56. The close-door-command signal So and the active signal $S_u$ are input to the NAND gate 57. An AND gate 55 is connected to the NAND gates 54 and 57 and connected to the set terminal of a flip flop 51. The output from the flip flop 1 is connected to the inverter 17.

A description will now be given of the circuit operation of the abnormality detecting circuit 52B. A slip sign output $\omega_s\pm$ is output from the microcomputer 31 on the basis of the results of speed loop operation and vector control operation, which are performed by the microcomputer 31. FIG. 2 shows a relation between the slip sign output $\omega_s\pm$ and the torque generated by the motor. In the relation shown in FIG. 2, the motor torque in the direction causing the door to close is positive, and the slip sign output $\omega_s\pm$ is 1. Namely, the polarities of the slip sign output $\omega_s\pm$ and of the motor torque are completely the same. If the polarity of the slip sign output $\omega_s\pm$ is determined, opening of the door can be detected.

For example, during normal running of the elevator, since the close-door-command signal $S_c$, the active signal $S_u$, the gate switch signal $S_G$ and the slip sign output $\omega_s\pm$ all have a level of "1", the items output from the NAND gates 54 and 57 also have a level of "1" owing to the function of the inverter gates 53 and 56. The input to the set terminal of the flip flop 51 therefore has a level of "1", and the flip flop 51 is not set. No gate cutoff signal is thus output to the inverter 17. Namely, the motor 10 is driven by the inverter 17.

When the slip sign output $\omega_s\pm$ has a level of "0" owing to an abnormality of the microcomputer 31 or the like during movement in a closed state of the door, since all the items input to the NAND gate 54 have a level of "1", the output from the NAND gate 54 and the output from the AND gate 55 have a level of "0". The flip flop 51 is thus set, and a gate cutoff signal is output from the flip flop 51 to the inverter 17. As a result, the driving of the motor is stopped.

When the gate switch signal $S_G$ has a level of "0" owing to the turnings off of the gate switch, which is caused by forcing the door to open, from a closed state when the elevator is moving, since all the items input to the NAND gate 57 have a level of "1", the output from the NAND gate 54 and the output from the AND gate 55 have a level of "0". As a result, the flip flop 51 is set. Namely, in this case, a gate cutoff signal is output from the flip flop 51 to the inverter 17 so as to stop the driving of the motor 10.

When the door is not closed or when the elevator is not moving, since the close-door command signal $S_c$ or the active signal $S_u$ has a level of "0", the items output from both the NAND gates 54 and 57 has a level of "1". The output from the AND gate 55 is thus kept at the level "1", and the flip flop 51 is not set. Namely, in this case, the detection of an abnormality with respect to opening of the door is interrupted.

As described above, in the present invention, the inversion pulse generated from the encoder 10A is not employed for detecting an abnormality, while the polarity $\omega_s\pm$ of the slip frequency signal is employed for detecting an abnormality. For example, even if the inversion pulse CCWP is output from the encoder 10A by forcing the door to open from a state in which the door is being kept closed, since the slip sign output $\omega_s\pm$ is maintained at the level "1", the motor torque acts in the positive direction, and safety is maintained. In addition, even if the inversion pulse CCWP is output from the encoder 10A owing to the vibration of the door, which is caused by pushing back at the door stop position when the door is closed, since the slip sign output $\omega_s\pm$ is maintained at the level "1", the motor torque acts in the positive direction in the same way as that described above.

As described above, the present invention can prevent the opening of the door of an elevator during running and can to improve safety and reliability.

What is claimed is:

1. An apparatus for controlling an elevator door comprising:
   a motor which closes and opens a door of an elevator and applies torque to the door to maintain the door in a closed state;
   an inverter apparatus connected to the motor for controlling the driving of the motor;
   polarity deciding means for deciding the polarity of a slip frequency signal output from the inverter apparatus; and
   stopping means for causing the inverter apparatus to stop the driving of the motor when the polarity deciding means detects an inversion of the polarity of the slip frequency signal during a time a closed state of the door is maintained by the motor.

2. An apparatus for controlling an elevator door according to claim 1 wherein the stopping means comprises:
   a logic circuit for performing a logical AND operation on a signal which indicates a closed state of the door and a decision signal output from the polarity deciding means; and
   a flip flop for outputting a gate cutoff signal to the inverter apparatus on the basis of the output from the logic circuit.

3. An apparatus for controlling an elevator door according to claim 1 wherein the stopping means comprises:
   a logic circuit for performing a logical AND operation on a signal which indicates a closed state of the door, a decision signal output from the polarity deciding means, and a signal indicating movement of the elevator; and a flip flop for outputting a gate cutoff signal to the inverter apparatus on the basis of the output from the logic circuit.

4. An apparatus for controlling an elevator door according to claim 1, wherein the polarity deciding means comprises a microcomputer.

5. An apparatus for controlling a door of an elevator car comprising:
- a drive motor drivingly connected to a door of an elevator car to move the door between an open and a closed position;
- an inverter apparatus connected to the drive motor for providing drive current to the drive motor and generating a slip frequency signal having a polarity indicating the direction in which the motor is to be driven;
- polarity determining means for determining the polarity of the slip frequency signal;
- condition determining means for determining when the door is being maintained in a closed position by the motor; and
- inverter control means for controlling the inverter to stop providing drive current to the drive motor when the polarity determining means detects an inversion of the polarity of the slip frequency signal at a time when the condition determining means determines that the door is in a closed position.

6. An apparatus for controlling a door of an elevator car comprising:
- a drive motor drivingly connected to a door of an elevator car to move the door between an open and a closed position;
- an inverter apparatus connected to the drive motor for providing drive current to the drive motor and generating a slip frequency signal having a polarity indicating the direction in which the motor is to be driven;
- polarity determining means for generating a slip sign signal $\omega_s\pm$ indicating the polarity of the slip frequency signal;
- logical operating means for receiving the slip sign signal $\omega_s\pm$, a close door command signal $S_c$, an active signal $S_u$, and a gate switch signal $S_G$ and performing a logical operation having a result equal to $(\omega_s \pm \cdot S_c \cdot S_u) \cdot (S_G \cdot S_c \cdot S_u)$.

wherein
- $\omega_s\pm$ has a first logical value when the motor is to be rotated in the direction to close the door and a second logical value when the motor is to be rotated in the direction to open the door,
- $S_c$ has a third logical value when the door is to be closed and a fourth logical value when the door is to be opened,
- $S_u$ has a fifth logical value when the elevator car is moving and a sixth logical value when the elevator car is stopped, and
- $S_G$ has a seventh logical value when the door is open by less than a safety position and an eighth logical value when the door is open by more than the safety position; and
- inverter control means for controlling the inverter to stop providing drive current to the drive motor based on the result of the logical operation.

7. An apparatus as claimed in claim 6 wherein:
- the first, third, fifth, and seventh logical values have a logical value of 1;
- the second, fourth, sixth, and eighth logical values have a logical value of 0; and
- the inverter control means controls the inverter to stop providing current when the result of the logical operation is a logical 0.

8. An apparatus for controlling a door of an elevator car comprising:
- a drive motor drivingly connected to a door of an elevator car to move the door between an open and a closed position;
- an inverter apparatus connected to the drive motor for providing drive current to the drive motor and generating a slip frequency signal having a first polarity when the drive motor is to open the door and a second polarity when the drive motor is to close the door; and
- inverter control means for controlling the inverter to stoop providing drive current to the drive motor based on the polarity of the slip frequency signal.

* * * * *